Patented May 6, 1952

2,595,343

UNITED STATES PATENT OFFICE 2,595,343

PRODUCTION OF POLYESTERS BY REACTING A DICARBOXYLIC ACID WITH A DIPHENOL

James Gordon Napier Drewitt, Spondon, near Derby, and James Lincoln, London, England, assignors to Celanese Corporation of America, a corporation of Delaware No Drawing. Application August 6, 1948, Serial No. 42,996. In Great Britain May 20, 1946

9 Claims. (Cl. 260—47)

This invention relates to the production of polymeric materials and in particular with the production of linear polymers containing ester groups in the polymer chain. The present application is a continuation-in-part of our application Serial No. 747,318, filed May 10, 1947 and now abandoned.

In the production of polyesters from aliphatic glycols and dicarboxylic acids, a smooth reaction takes place when the free glycols and the free carboxylic acids are used though in order to obtain high polymers it is usually necessary to heat for long periods under very low absolute pressures. The same applies to a reaction between the free glycols and methyl or other low alkyl esters of the dicarboxylic acids, which is usually carried out in the presence of an ester-interchange catalyst. When however these reactions are applied to the production of polyesters from diphenols, as opposed to aliphatic glycols, and dicarboxylic acids, difficulties arise, probably owing to relatively low reactivity, and it is difficult or impossible to obtain polyesters having molecular weights sufficiently high for many purposes. Accordingly for the production of polyesters of this type recourse has been had to the reaction between the free diphenol and the dihalide, usually the dichloride, of the dicarboxylic acid, the reaction being carried out in the presence of a base, for example caustic soda, to combine with the hydrohalide acid set free. While this reaction has the advantage that it enables polyesters of relatively high molecular weight to be produced somewhat more easily than when using the free dicarboxylic acids, nevertheless it is still difficult to obtain really high molecular weights suitable for example for filament and film formation and moreover the reaction is not smooth, the reaction mass tends to become pasty due to the separation of the solid sodium chloride or like by-products and therefore is not homogeneous but, above all, there is a serious tendency to develop discoloration, the products frequently being yellow to reddish brown or other dark colour. This considerably restricts the applications of the products which moreover have to be purified from the by-product.

We have found that a much smoother reaction is possible and light coloured polyesters obtainable by condensing the free dicarboxylic acid with the diphenol, the latter either being used in the form of its diacetate or being used together with acetic anhydride. The diphenol may of course be readily converted to its diacetate by reaction with acetic anhydride. Moreover the condensation can more readily yield products of relatively high or high molecular weight. The improvement obtainable by this device is very much greater than any improvement which can be obtained by the use of the same device applied to the reaction between aliphatic glycols and free dicarboxylic acids.

We may use any diphenols and any dicarboxylic acids, for instance resorcinol and its substitution products 2.2'-dihydroxy-diphenyl and 1.8-dihydroxy naphthalene on the one hand and adipic acid, sebacic acid, oxalic acid, $\gamma$-acetyl-$\gamma$-methyl pimelic acid, $\gamma$-keto pimelic acid, suberic acid and glutaric acid on the other hand. However, we prefer to employ pairs of compounds one of which is a compound containing aryl nuclei linked in certain ways to the reactive groups of the molecule. Particularly important are compounds containing a single benzene nucleus linked in the para position either directly or through carbon atoms to the reactive groups and compounds containing two benzene nuclei linked to each other directly or through other atoms or groups, e. g. —(CH$_2$)$_n$—, —CO—, —O—, —S—, SO$_2$—, and —NR—, and linked in the 4.4' positions directly or through carbon atoms to the reactive groups. Thus these compounds are of the types (i)

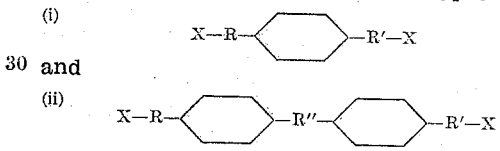

and (ii)

where X is the hydroxy or carboxy group, R and R' are direct linkages or, where X is the carboxy group, one or more carbon atoms and R'' is a direct link or one or more carbon atoms and/or hetero atoms. Generally it is found that better results are obtained where R, R' and R'' are direct linkages or a chain containing an even number of atoms. All these compounds give linear polymers having higher melting points than polymers obtained from purely aliphatic reagents and also higher melting points than polymers obtained from corresponding reagents containing benzene nuclei linked in different positions, e. g. in the ortho or meta position with a single benzene nucleus or in the 2.2', 3.3' or 4.2' positions with two benzene nuclei. Similarly, high melting polymers may be obtained from corresponding reagents containing a single naphthalene nucleus linked in the 1.4, 1.5, 2.6 or 2.7 positions but not from compounds linked in the 1.2 or 1.3 positions.

Generally it will be seen that the above compounds are bifunctional reagents in which the two functional groups are linked together through one or more aromatic nuclei and that the linkages to the aromatic nuclei are such that (taking the shortest path through the carbon atoms of the nucleus) there are at least 4 nuclear carbon atoms in each aromatic nucleus between the linkages. In this definition it will be noted that a single benzene ring or a single naphthalene ring counts as one aromatic nucleus, while

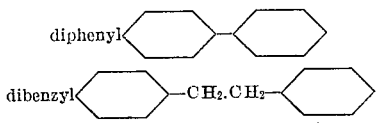

and

count as two aromatic nuclei.

Examples of such reagents are on the one hand hydroquinone, 2.5-dichlorhydroquinone, 4.4'-dihydroxydiphenyl, 4.4'-dihydroxybenzophenone, 4.4'-dihydroxydiphenyl sulphone, α-β-bis-(4-hydroxyphenoxy)-ethane, 4.4'-dihydroxy-3.5.3'.5' or 2.5.2'.5'-tetramethyl diphenyl, 4.4'-dihydroxy-3.5.3'.5'-tetramethyl-diphenyl methane, 4.4'-dihydroxy-stilbene, 1.4 - dihydroxy - naphthalene, 2.3-dichlor-1.4-dihydroxy-naphthalene, 1.5-dihydroxy-naphthalene, 2.6-dihydroxy-naphthalene and 2.7-dihydroxy-naphthalene, and on the other hand 4.4'-dicarboxy-diphenyl, terephthalic acid, 2.5-dichlor-terephthalic acid, 2.6-dimethyl-terephthalic acid, 4.4'-dicarboxy-dibenzyl, 4.4'-dicarboxy-diphenyl sulphone and 4.4'-dicarboxy-3.3'-dimethyl-diphenyl.

Polyesters may be produced using as each component, i. e. diphenol and the dicarboxylic acid, one of the special reagents listed above, but generally this leads to polymers of rather too high melting point for ready working up, for example melt spinning, so that it is preferred to employ only one of the components having this particular structure.

The condensations to produce the polymers of the present invention can be effected generally by heating the components at temperatures of 100–350° C., but of course below decomposition temperatures, and preferably at 200–280° C. or 300° C. If desired, cataylsts may be present, for example catalysts facilitating the elimination of water, such as p-toluene sulphonic acid or a trace of phosphoric acid. It is of advantage to conduct the reaction, at least in its later stages, in vacuo and especially under an extremely low absolute pressure. The condensations are preferably carried out in an atmosphere of an oxygen-free inert gas, for example hydrogen or nitrogen, a stream of which may be passed over or through the reaction mixture.

The poly-condensations are best effected with the reagents and their products of reaction in the molten state or in solution in a suitable solvent medium, for example m-cresol or phenol which is liquid at the reaction temperature.

The invention is particularly directed to the production of polymers which are of sufficiently high molecular weight to be capable of forming self-supporting films or filaments and preferably of sufficiently high molecular weight to give filaments which can be cold drawn. Accordingly, the reagents should be used in such proportions that the ocmplementary reactive groups are present in the reaction mixture in substantially equivalent amounts and the reaction is continued until the desired high molecular weight is achieved. In some cases this may take many hours or even some days. By substantially equivalent amounts, we mean amounts which are chemically equivalent within five per cent. The nearer the ratio is to chemical equivalence, the higher may be the molecular weight achieved and accordingly we prefer to use amounts that give chemical equivalene within less than two per cent, e. g. ½ to 1%.

Polyesters can be prepared in accordance with the invention by reacting a mixture of two or more diphenols with one or more dicarboxylic acids or a mixture of two or more dicarboxylic acids with one or more diphenols.

The following examples illustrate the invention but do not limit it in any way:

*Example 1*

Hydroquinone was acetylated to the diacetate by treatment with acetic anhydride using a small amount of sulphuric acid as catalyst. The product was poured into water, washed and dried. It had a melting point of 122° C. and possibly contained a trace of sulphuric acid, which could act as acid-interchange catalyst in the subsequent poly-esterification.

19.4 parts of the hydroquinone diacetate and 14.6 parts of adipic acid (equal moles) were heated in a slow stream of oxygen-free nitrogen for two hours at 220–230° C. and then the heating was continued at 230–235° C. at an absolute pressure of 0.5 mm. of mercury with a slow stream of oxygen-free nitrogen bubbling through the melt. After one hour under these conditions the polymer achieved a constant melting point of 224–226° C. but the reaction was continued until a polymer having filament-forming properties was produced. In parallel experiments the time necessary varied with the rate of nitrogen passage and with the absolute pressure. Analysis of the polymer showed C, 64.92%; H, 5.55% as compared with C, 65.45%; H, 5.45% for

A similar polymer was produced replacing the hydroquinone by 1.4-dihydroxy-naphthalene in equivalent amounts.

It is noted that in the above experiments and with those detailed in Example 2 below it is particularly important to avoid the presence of oxygen to prevent undue development of colour.

*Example 2*

33 parts of hydroquinone, 43.8 parts of adipic acid (equal moles) and 66 parts of acetic anhydride were refluxed for one hour with a still-base temperature of 200° C. The reflux condenser was then removed and the heating continued for two hours at 220–230° C., for a further 3 hours at the same temperature and an absolute pressure of 0.5 mm. of mercury and finally for upwards of an hour at 230–240° C. under a pressure of 0.0001 mm. The product, similar to that of Example 1, had a melting point of 224–226° C.

Having described our invention, what we desire to secure by Letters Patent is:

1. Process for the production of polyesters, which consists in heating a free dicarboxylic acid whose two carboxylic acid groups are its sole reactive groups with a substantially equimolecular proportion of a reactant medium selected from the group consisting of a free diphenol, whose two phenolic groups are its sole reactive groups, together with acetic anhydride and the corresponding diphenol diacetate.

2. Process for the production of polyesters, which comprises heating a free dicarboxylic acid, whose two carboxylic groups are its sole reactive groups, with a substantially equimolecular proportion of the diacetate of a diphenol whose two phenolic groups are its sole reactive groups.

3. Process for the production of polyesters, which comprises heating a free dicarboxylic acid, whose two carboxy groups are its sole reactive groups, with a substantially equimolecular proportion of a free diphenol, whose two phenolic groups are its sole reactive groups, in the presence of acetic anhydride.

4. Process for the production of polyesters, which comprises heating a free dicarboxylic acid, whose two carboxy groups are its sole reactive groups, with a substantially equimolecular proportion of a diphenol in which the two phenolic groups are its sole reactive groups and are linked to an aromatic nucleus by linkages separated by at least four nuclear carbon atoms, the reaction being carried out in the presence of acetic anhydride.

5. Process for the production of polyesters, which comprises heating a free dicarboxylic acid, whose two carboxy groups are its sole reactive groups, with a substantially equimolecular proportion of a diphenol in which the two phenolic groups are its sole reactive groups and are linked to an aromatic nucleus by linkages separated by at least four nuclear carbon atoms, the diphenol being used in the form of its diacetate.

6. Process for the production of polyesters, which comprises heating a free dicarboxylic acid, whose two carboxy groups are its sole reactive groups, with a substantially equimolecular proportion of hydroquinone diacetate.

7. Process for the production of polyesters, which comprises heating a free dicarboxylic acid, whose two carboxy groups are its sole reactive groups, with a substantially equimolecular proportion of hydroquinone in the presence of acetic anhydride.

8. Process for the production of polyesters, which comprises heating adipic acid with a substantially equimolecular proportion of hydroquinone diacetate.

9. Process for the production of polyesters, which comprises heating adipic acid with a substantially equimolecular proportion of hydroquinone in the presence of acetic anhydride.

JAMES GORDON NAPIER DREWITT.
JAMES LINCOLN.

REFERENCES CITED

The following references are of record in the file of this patent:

UNITED STATES PATENTS

| Number | Name | Date |
|---|---|---|
| 2,331,169 | Bruson | Oct. 5, 1943 |
| 2,496,933 | Caldwell | Feb. 7, 1950 |